United States Patent
Thacher

[11] Patent Number: 5,908,523
[45] Date of Patent: Jun. 1, 1999

[54] METHOD FOR RECAPPING VEHICLE TIRES

[75] Inventor: John W. Thacher, San Jose, Calif.

[73] Assignee: VFR, Inc., Loomis, Calif.

[21] Appl. No.: 08/654,626

[22] Filed: May 29, 1996

[51] Int. Cl.[6] ............................................. B29D 30/62
[52] U.S. Cl. .................. 156/125; 156/96; 156/128.1; 156/909; 264/328.3; 425/17; 425/24; 425/25
[58] Field of Search .................. 156/96, 125, 394.1, 156/909, 128.1; 425/17, 24, 25; 264/328.3, 328.11, 326

[56] References Cited

U.S. PATENT DOCUMENTS

| | | | |
|---|---|---|---|
| 1,932,692 | 10/1933 | Fetter | 18/17 |
| 2,066,265 | 12/1936 | Freeman | 18/53 |
| 2,569,935 | 10/1951 | Leguillon et al. | 154/9 |
| 2,724,425 | 11/1955 | Ostling | 154/14 |
| 2,744,290 | 5/1956 | Corson | 425/17 |
| 2,791,805 | 5/1957 | White | 18/18 |
| 2,855,629 | 10/1958 | Barefoot | 18/18 |
| 2,873,790 | 2/1959 | Cadwell et al. | 264/328.3 |
| 3,020,190 | 2/1962 | Pfeiffer | 156/125 |
| 3,276,930 | 10/1966 | Keefe, Jr. | 156/128 |
| 3,770,858 | 11/1973 | Ireland et al. | 264/36 |
| 3,793,420 | 2/1974 | Fredricks et al. | 264/89 |
| 3,808,076 | 4/1974 | Barwell | 156/96 |
| 3,816,217 | 6/1974 | Barefoot | 156/394 |
| 3,847,631 | 11/1974 | MacMillan | 156/96 |
| 3,853,666 | 12/1974 | Barefoot | 156/394 |
| 3,894,897 | 7/1975 | Batchelor et al. | 156/96 |
| 3,969,179 | 7/1976 | Foegelle | 156/394 |
| 4,080,230 | 3/1978 | Batchelor et al. | 156/96 |
| 4,090,901 | 5/1978 | Baatz | 156/96 |
| 4,097,565 | 6/1978 | Cole et al. | 264/40.3 |
| 4,139,592 | 2/1979 | Gallizia | 264/328.3 |
| 4,253,513 | 3/1981 | Larson et al. | 156/125 |
| 4,298,321 | 11/1981 | Gallizia | 425/17 |
| 4,313,909 | 2/1982 | Boden et al. | 156/125 |
| 4,400,342 | 8/1983 | Logan | 264/501 |
| 4,446,093 | 5/1984 | Mattson | 264/315 |
| 4,490,325 | 12/1984 | Mattson et al. | 264/315 |
| 4,575,438 | 3/1986 | Fike et al. | 264/36 |
| 4,604,256 | 8/1986 | Greenwood et al. | 264/501 |
| 4,715,577 | 12/1987 | Greenwood et al. | 249/107 |
| 4,816,198 | 3/1989 | Mattson | 264/40.6 |
| 4,851,063 | 7/1989 | Seiberling | 156/123 |
| 4,857,122 | 8/1989 | Majerus | 156/125 |
| 5,055,148 | 10/1991 | Lindsay et al. | 156/96 |
| 5,127,811 | 7/1992 | Trethowan | 425/32 |
| 5,151,148 | 9/1992 | Lindsay et al. | 156/351 |

FOREIGN PATENT DOCUMENTS

| 1508135 | 1/1968 | France | 156/125 |
|---|---|---|---|

*Primary Examiner*—Geoffrey L. Knable
*Attorney, Agent, or Firm*—Bernhard Kreten

[57] ABSTRACT

A method, apparatus and article of manufacture for tires in order to salvage used tire casings of tires and recap them with a better mechanical and chemical bond involving the use of hot water to accelerate the cure rate and uncured tire compound placed on the tire casing subjected subsequently to heat and pressure.

15 Claims, 8 Drawing Sheets

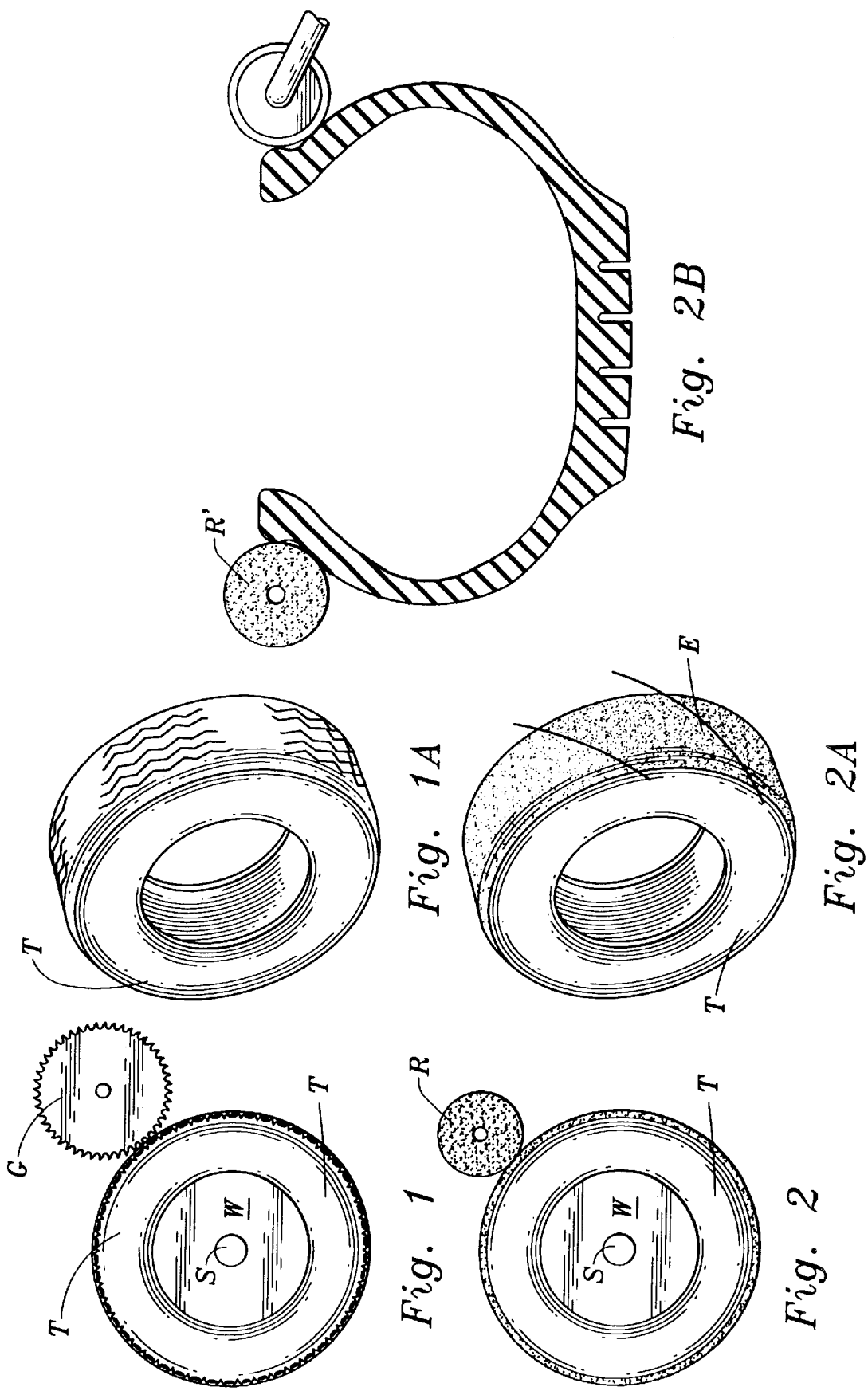

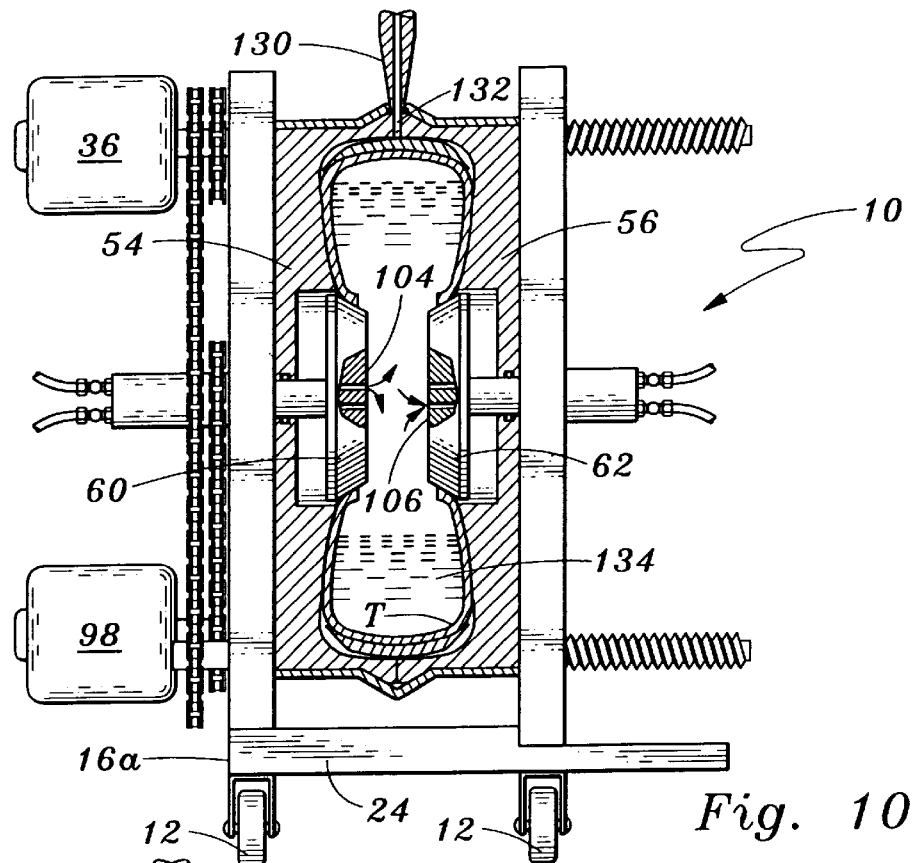
Fig. 10
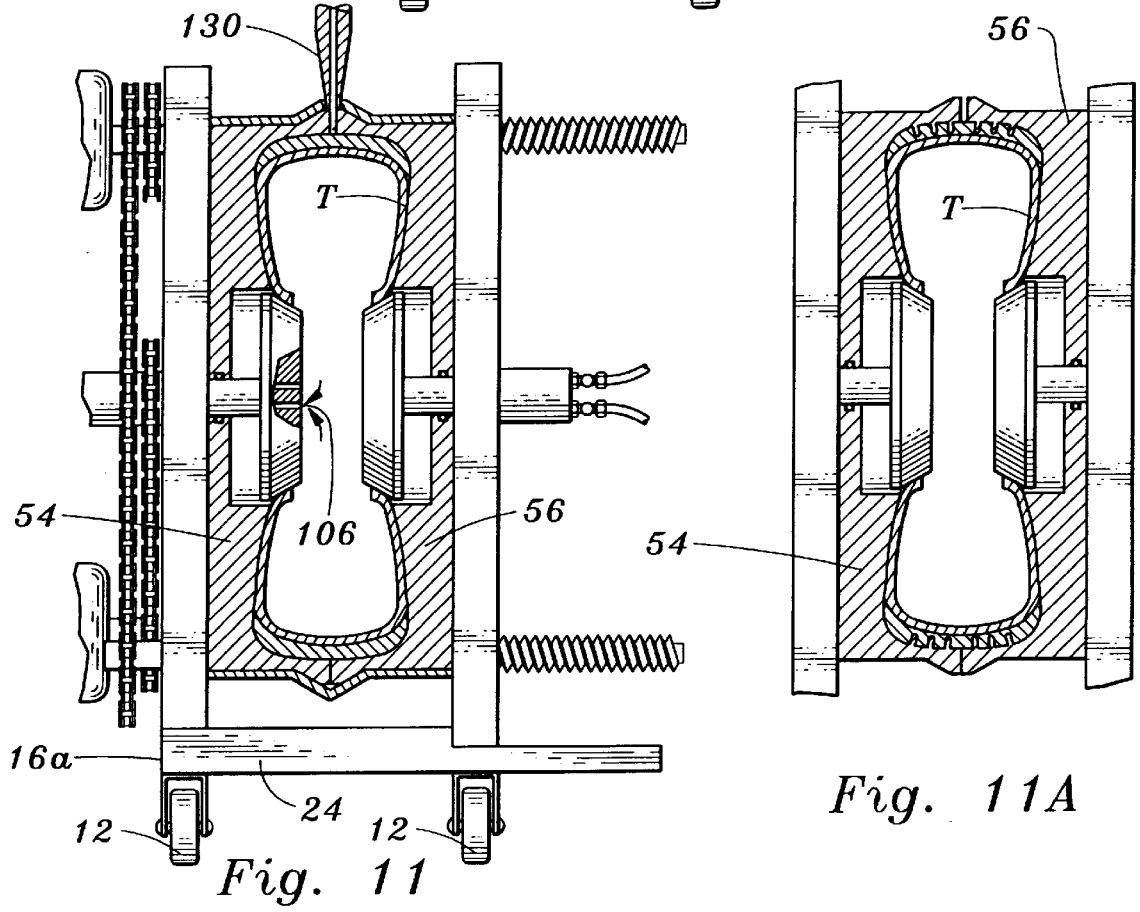
Fig. 11
Fig. 11A

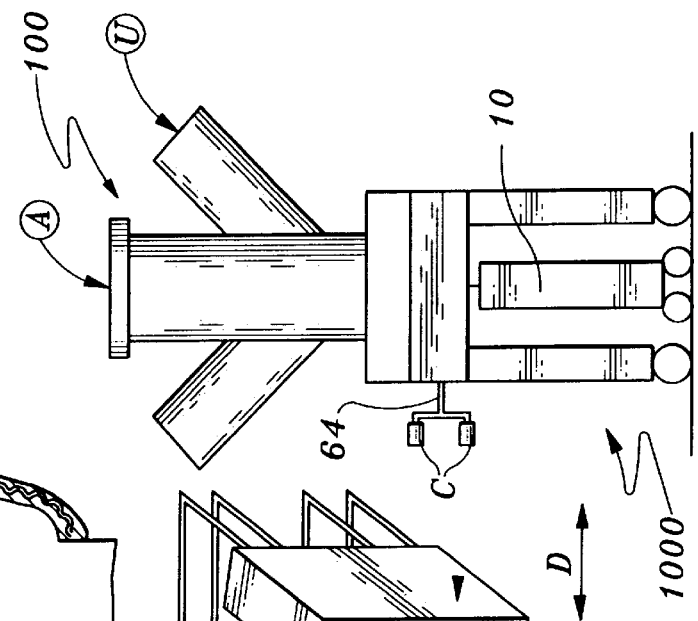
Fig. 15
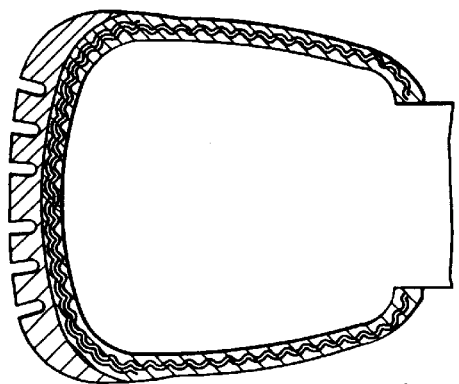
Fig. 14
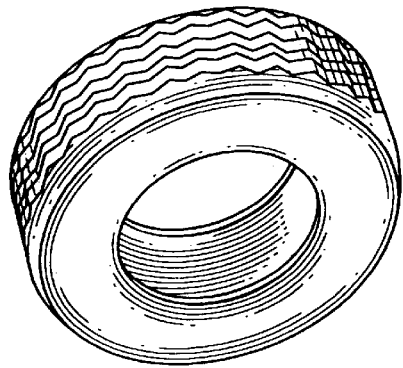
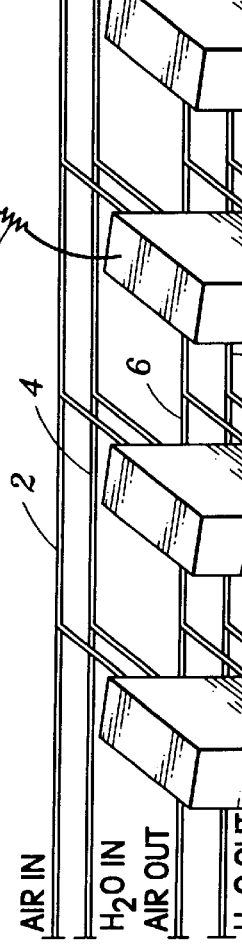
Fig. 16

METHOD FOR RECAPPING VEHICLE TIRES

FIELD OF THE INVENTION

The following invention relates generally to a method and apparatus for building up material on an outer surface of a hollow toroidal shaped object. More specifically, the instant invention is directed to an apparatus and method for recapping vehicular tires.

BACKGROUND OF THE INVENTION

Despite the ongoing efforts in modern society to recycle, the efforts towards recycling tires has curiously remained a difficult problem to solve. This problems persists today because the technology for manufacturing new tires—radial tire technology—has virtually made obsolete the technology for recapping tires. As a result, the industry for recapping tires has all but vanished in recent years. In its place, huge mountains of spent tires are being stockpiled at dump sites where they constitute a waste of space, an ongoing eye sore and danger should they be ignited. Reports occur of mountains of spent tires having caught fire. These fires often burn unchecked until all of the stockpiled tires have been consumed, an event that can takes months, if not years. During the uncontrolled burning, the atmosphere is polluted and the ground contaminated by rivers of molten petroleum products released from the burning tires. Damages are incalculable.

Once, recapping tire casings was a thriving, established industry. The industry still survives today, if only for applications directed substantially toward industrial and commercial vehicle tires. Even so, the industry still suffers from a wide variety of problems. The most prevalent problem is the dislodgment of the annular band defining the recap from the spent tire casing. The primary reason that the recap band becomes disassociated from the tire casing is poor adhesion. High vehicular speeds create extreme heat which causes separation along the interface between the tire casing and recap band. Variances in the recap band shape exacerbate this problem. This separation contributes to the frequent failure of recapped tires. This failure has been the principal reason most retail consumers are biased against retreads. Yet, economics still support the retread business for commercial and industrial tires (because of the high cost of these tires). Thus, tire sales to commercial fleet companies still remain commonplace.

Until the advent of the radial tire, the predominate method for recapping spent tire casings was the hot capping method. With this method, a spent tire casing (also called a carcass or tire carcass) was prepared, and then a recap band of uncured rubber was introduced along the outside periphery of the tire casing. The tire casing was stretched and under high temperature and pressure, typically 160 psi and 305° F.; the band of uncured rubber was adhered, as it cured, to the tire casing creating a sturdy and robust retread by creating a fairly strong bond between the new and the old rubber. However, with radial tires, traditional methods for recapping could not be used. Although the new radial tire technology provided a much stronger tire initially, when the radial tire wore out, the prospects for retread were dismal. The known hot capping technology could not be used for radial tires. The primary difficulty with retreading of radial tires is that a radial tire cannot be stretched. The radial cords imbedded in the tire rubber prevent the stretching of the tire casing—a necessary and integral procedure for the manufacturing of retreads using the prior hot capping method.

Because of the inability to stretch the spent radial tire casings under high temperature and pressure, alternative procedures were developed without stretching, using lower temperatures and pressures. The alternative procedures were inferior. The alternative procedures provided for application of the uncured rubber to the spent radial tire at much lower temperatures and pressures. Typically, heated, highly pressurized air, or gas, was used to provide both the heat and pressure needed for the process. Curing times were longer, which substantially lengthened manufacturing time. Moreover, without high temperatures and pressures, the strength of the recap rubber was compromised resulting in an inability to obtain the stronger recap band of previous retreads. As a consequence, the life of the retread tire was shortened, and its economic value diminished. Further, because of the use of highly pressurized air, safety risks to manufacturing process operators were substantial. When the pressurized air system failed during the manufacturing process, the instantaneous pneumatic expansion—a violent explosion—could, and did, cause severe injury and death.

Cold capping of retread tires was developed as an alternative to the hot capping method. With cold capping, the recap band was precured prior to attaching it to the tire casing. Typically, the recap band was cured at the desirable higher temperatures and pressures as a flat piece of rubber. The precured recap band was later attached with adhesive to the perimeter of the tire casing. Although the precured recap band had the superior qualities of the hot cap recap band manufactured using high pressure and temperature, because precured rubber has a "memory" of the shape in which it was originally cured, the precured flat recap band tried to return to its original shape after it was adhered to the tire casing. That is, with cold capping, the memory of the precured flat recap band resists the curved shape of the tire casing perimeter, fighting the adhesive which attaches it to the tire casing. Because the memory of the recap band opposed the adhesive, the life of the adhesive was diminished. Yet curing the recap band in a curved shape to match the tire casing perimeter is so costly as to make it an unattractive and commercially undesirable alternative to the precured flat recap band. The aesthetic of the retread manufactured by the cold capping process also diminished it's commercial success with the retail consumer as the cold cap retread was considered unattractive.

With the radial tire causing the retread manufactured by the hot capping process to be of substantially diminished quality, and the retread manufactured by the cold capping process to also be undesirable, the retread business has sharply fallen off in recent years. It is only in the commercial and industrial vehicle market, where new tire costs is substantially higher, that the retread business has managed to survive. The retail consumer tires of today are just not retread—instead spent tires are retired to the unsightly, and ever expanding, stockpiles of local waste sites.

The following documents further reflect the state of the art of which applicant is aware and have been included herewith to discharge applicant's acknowledged duty to disclose relevant prior art. It is stipulated, however, that none of the prior art teach singly nor render obvious when considered in any conceivable combination the nexus of the instant invention as set forth hereinafter and as especially claimed.

| INVENTOR | ISSUE DATE | U.S. PAT. NO. |
|---|---|---|
| Fetter | October 31, 1933 | 1,932,692 |
| Freeman | December 29, 1936 | 2,066,265 |
| Leguillon, et al. | October 2, 1951 | 2,569,935 |
| Ostling | November 22, 1955 | 2,724,425 |
| White | May 14, 1957 | 2,791,805 |
| White | May 27, 1958 | 2,835,921 |
| Barefoot | October 14, 1958 | 2,855,629 |
| Pfeiffer | February 6, 1962 | 3,020,190 |
| Keefe | October 4, 1966 | 3,276,930 |
| Ireland, et al. | November 6, 1973 | 3,770,858 |
| Fredericks, et al. | February 19, 1974 | 3,793,420 |
| Barefoot | June 11, 1974 | 3,816,217 |
| MacMillan | November 12, 1974 | 3,847,631 |
| Barefoot | December 10, 1974 | 3,853,666 |
| Foegelle | July 13, 1976 | 3,969,179 |
| Batchelor, et al. | March 21, 1978 | 4,080,230 |
| Baatz | May 23, 1978 | 4,090,901 |
| Cole, et al. | June 27, 1978 | 4,097,565 |
| Logan | August 23, 1983 | 4,400,342 |
| Mattson | May 1, 1984 | 4,446,093 |
| Mattson, et al. | December 25, 1984 | 4,490,325 |
| Fike, et al. | March 11, 1986 | 4,575,438 |
| Greenwood, et al. | August 5, 1986 | 4,604,256 |
| Greenwood, et al. | December 29, 1987 | 4,715,577 |
| Mattson | March 28, 1989 | 4,816,198 |
| Seiberling | July 25, 1989 | 4,851,063 |
| Majerus | August 15, 1989 | 4,857,122 |
| Lindsay, et al. | October 8, 1991 | 5,055,148 |
| Trethowan | July 7, 1992 | 5,127,811 |
| Lindsay, et al. | September 29, 1992 | 5,151,148 |

The patent to Baatz teaches the use of a recapping method for tires using a flat precured recap band. The tire to be recapped is placed within an envelope with the precured recap band thereabout. A hose runs from inside the envelope to outside the tank in which the tire is placed. Hot water is pumped into the airtight tank. The rising air and water pressure force the air out of the envelope and press the envelope firmly against the recapped tire to hold the recap band securely in place.

The two patents to Lindsay, et al. (U.S. Pat. Nos. 5,055, 148 and 5,151,148) teach the use of a method and system for retreading spent tires with precured treads utilizing time and temperature in conjunction with an envelope pressure system. A precured rubber tread is applied to a tire casing having a cushion gum disposed therebetween. An envelope system is placed over the tread/tire casing and this assembly is placed within a pressure chamber. Heat and fluid pressure are then supplied to the chamber. Fluid pressure is then supplied to the chamber after both a predetermined length of time and after a predetermined temperature of the chamber has been reached.

The patent to Seiberling teaches the use of a radiation cure of tire plies. In a continuous operation, steam or hot water is led into the mold through a pipe and provides sufficient pressure within the tire to force it against the mold to groove the tread and form any desired identification and indicia marks desired on the tire surface. The tire is cured at usual temperatures, and steam or hot water is used in the usual manner, but without an air bag or bladder.

The patent to Foegelle teaches the use of a curing apparatus which may be used for vulcanizing a pre-cured tread onto a suitably prepared tire casing. The apparatus provides a mold defining a chamber in which the tire casing and adhesively attached pre-cured tread are placed and includes means for establishing pressurized fluid, such as steam or air, within the interior of the tire casing and pressurized fluid, such as steam, in the annular space between the casing and the inside peripheral surface of the chamber.

The patent to Trethowan teaches the use of a bladderless tire mold press for tires, including lower and upper platens and a mechanism for moving the platens relatively toward one another from an open position to a closed molding position. Each of the platens further includes a mechanism for molding tire beads. Note column 4, from line 26. The curing medium may be steam or hot water. The effect of this is to expand the green tire so as to properly engage with the various molds surrounding it.

The patent to Majerus teaches the use of a process for injection molding tire treads. Note the discussion of operation starting at column 4, line 16 through column 5, line 17, which utilizes a first low pressure on the interior of the tire casing to position the tire casing until the injection of tread material is complete and then uses a second higher pressure for curing.

The remaining citations not specifically discussed diverge even further from the focal point of patentable novelty as set forth hereinbelow.

SUMMARY OF THE INVENTION

The present invention is distinguished over the known prior art in a plurality of ways. Most significantly, the present invention is distinguished over the known prior art in that the tread portion which circumscribes a tire casing is adhered in a manner which achieves all possible benefits. Thus, the present invention provides for the manufacturing of retreads especially solving the radial tire problem, in a far more effective manner than heretofore.

Another facet of the instant invention involves the manner in which the instant invention addresses manufacturing protocols for the purpose of not only increasing the degree to which the tread adheres to the tire casing, but also the amount of time required in fabricating an improved recap. The instant invention greatly decreases recapping cycle time.

More specifically, the present invention is distinguished over the known prior art, inter alia, in that the invention relies upon the utilization of uncured tire compounds as the preferred material which overlies and bonds with the tire casing. By using uncured material, the subsequent step of curing and adhering increases the degree, depth and quality of adherence of the new tread to the tire casing.

A further benefit to the use of uncured tire compounds, and curing in situ, is that recap band's memory recalls the shape of the tire it is adhered to an not and arbitrary or flat shape (such as that used for a precured recap band).

Another component involves the utilization of hot water directly on the interior surface of the tire casing. An exterior overlying, enveloping matrix serves as a form which holds the tire casing, receives the injected tire compound defining the recap band and defines a tread which is to be disposed on the recap band. As a general rule, thermal conductivity is greater through a liquid than through a gas. By admitting extremely hot water, or other heated incompressible liquid to the interior of the tire casing, the rate of thermal transfer is improved to both cure and bond the uncured composition to the tire casing. With both the matrix heated, and the interior of tire casing heated, the heat migration across the tire compound occurs much faster than just the heating of the matrix alone. Using water or other incompressible fluid on the inside of the tire casing has the added benefit of exerting pressure on the interior of the tire casing outwardly in response to the forces exerted by the matrix and through the uncured material onto the tire casing.

Thus, the combination of injected uncured material with high temperature incompressible fluid at high pressure (hydraulic pressure) improves the chemical and mechanical bonding between the tire casing and the material. It also increases the strength and life of the recap tire band because the temperatures and pressures used for curing are well in excess of those previously used, thereby creating a stronger, tougher recap band.

Additional benefits to the foregoing involve the adherence and appearance of the retread so formed. The uncured tire compound is adhesively molded to the contour of the tire casing, that is, the cracks and crevasses of the tire casing surface are penetrated by the uncured tire compound and become the adhesion surface (when the tire compound of the recap band is applied under heat and pressure). Good adhesion results and the recap band appears integral with the tire casing, taking on the appearance of a new tire. Moreover, because the tire compound of the recap band is injected and its shape closely controlled, the tire is not caused to be deformed in any way.

In the past, many spent tires could not be retreaded because of broken tire shoulders and/or broken tire belts and/or punctures. With the present invention, there is a much greater tolerance for acceptance of spent tires for retread because the uncured tire compound is able to build up broken shoulders and/or fill holes and/or adhere to areas having broken tire belts.

With regard to the manufacturing process safety risk, the potential for an explosion is substantially diminished. Because the present invention uses hydraulic pressure rather than pneumatic pressure, there is no risk of an explosion caused by a pneumatic failure. Thus, the safety of the process is greatly improved.

An ancillary benefit from the foregoing involves an increase in productivity in forming a recap. The amount of time when a tire casing must be disposed within an enveloping matrix is reduced because of the improved thermal conductivity, pressure and adherence that occurs thereby shortening the amount of time required to form a retread. Because the retread has superior bonding characteristics to the tire casing, the retread exhibits greater properties in the intended operating environment, on the road.

OBJECTS OF THE INVENTION

Accordingly, it is a primary object of the present invention to provide a new and novel apparatus for forming recapped tires, a method associated therewith and the article of manufacture formed thereby.

It is a further object of the present invention to provide a system as characterized hereinabove which reduces the amount of time required to fabricate a recapped tire.

A further object of the present invention is to provide a system as characterized above where the properties of adhesion, between the recap band and the tire casing, are improved when compared with prior art teachings.

Yet another object of the present invention is to provide a system as characterized above where the wear properties of the recapped are improved so as to extend the life of the recapped tire.

A further object of the present invention is to provide a system as characterized above which exhibits greater safety on the road than has been known heretofore.

A still further object of the present invention is to provide a system characterized by its ability to accept for retread tires which would normally not be considered, such a those spent tires with broken shoulders, broken belts, or holes.

A further object of the present invention is to provide a system as characterized above which lends itself to mass production techniques.

A further object of the present invention is to provide a system as characterized above which benefits from the properties of using uncured tire compound when first introduced to the tire casing so that subsequently, upon curing by use of heat and pressure, an improved bond will be evidenced between the tire casing and the uncured rubber compound.

A further object of the present invention is to provide a device as characterized above which exhibits greater safety during the fabrication process.

Viewed from a first vantage point, it is an object of the present invention to provide a process for retreading a spent tire, comprising, in combination: providing a buffed tire casing ready to receive uncured tire compound for the recap band; placing the tire casing into a mold cavity which has a tire compound entry point; rotating the tire casing within the mold cavity past the entry point while injecting uncured tire compound into a space between the tire casing and interior cavity walls of the mold cavity; pressurizing an interior of the tire casing by injecting heated fluid into the interior of the tire casing to resist forces on an exterior of the tire casing due to injecting the tire compound; forming a tread pattern onto the tire compound; curing the tire compound to the tire casing thereby creating the recap band; and removing the thus formed retreaded tire from the mold cavity.

Viewed from a second vantage point, it is a further object of the present invention to provide an apparatus for retreading a spent tire, comprising, in combination: means for defining a generally annular chamber adapted to receive both a tire casing and injected, uncured tire compound; means for seating tire casing beads on a tire rim within the annular chamber; means for pressurizing an interior of the tire casing with heated fluid; means for injecting uncured tire compound into the annular chamber outside of the tire casing; and means to pressurize and cure the uncured tire compound thereby forming the recap band.

Viewed from a third vantage point, it is a further object of the present invention to provide a method of recapping a tire, comprising the steps of: placing the tire in a matrix; seating the tire on a tire rim with air pressure; closing the matrix; rotating the tire; forcing tire compound into the matrix and onto a periphery of the tire as the tire is rotated; replacing the air within the tire by forcing an incompressible fluid into an interior of the tire; maintaining a pressure differential between the tire compound and the interior of the tire until the tire compound is cured; evacuating the fluid from the tire; opening the matrix; and removing the tire.

Viewed from a fourth vantage point, it is a further object of the present invention to provide a tire, comprising, in combination: a tire casing; a buffed periphery circumscribing the tire casing; and a band of rubber bound to the buffed periphery.

Viewed from a fifth vantage point, it is a further object of the present invention to provide an apparatus for recapping a tire formed from a tire casing, comprising, in combination: means for buffing the periphery circumscribing the tire casing; means for applying a band of uncured rubber coated on the periphery; and means for curing the band of uncured rubber.

Viewed from a sixth vantage point, it is an object of the present invention to provide a method of recapping a tire, comprising the steps of: placing the tire in a full circumferential matrix; seating the tire on a tire rim with air pressure; closing the matrix; rotating the tire; forcing tire compound into the matrix and onto a periphery of the tire as the tire is rotated; replacing the air within the tire by forcing an incompressible fluid into an interior of the tire; maintaining a pressure differential between the tire compound and the interior of the tire until the tire compound is cured; evacuating the fluid from the tire; opening the matrix; removing the tire; and injecting water initially at less than 40 psi into the tire prior to rotating the tire.

Viewed from a seventh vantage point, it is an object of the present invention to provide a method of recapping a tire, comprising the steps of: placing the tire in a full circumferential matrix; seating the tire on a tire rim with air pressure; closing the matrix; rotating the tire; forcing tire compound into the matrix and onto a periphery of the tire as the tire is rotated; replacing the air within the tire by forcing an incompressible fluid into an interior of the tire; maintaining a pressure differential between the tire compound and the interior of the tire until the tire compound is cured; evacuating the fluid from the tire; opening the matrix; removing the tire; and forcing the tire compound in an uncured state at a pressure less than 600 pounds per square inch.

Viewed from an eighth vantage point, it is an object of the present invention to provide a method of recapping a tire, comprising the steps of: placing the tire in a full circumferential matrix; seating the tire on a tire rim with air pressure; closing the matrix; rotating the tire; forcing tire compound into the matrix and onto a periphery of the tire as the tire is rotated; replacing the air within the tire by forcing an incompressible fluid into an interior of the tire; maintaining a pressure differential between the tire compound and the interior of the tire until the tire compound is cured; evacuating the fluid from the tire; opening the matrix; removing the tire; and increasing fluidic pressure inside the tire when filled with heated water to 560 psi, while increasing delivery pressure on the tire compound to 600 psi, whereby the tire compound is rapidly cured.

These and other objects will be made manifest when considering the following detailed specification when taken in conjunction with the appended drawing figures.

BRIEF DESCRIPTION OF THE DRAWINGS

FIG. 1 is a schematic depiction from a side view thereof of the rough shaping step of the shaping station according to the present invention.

FIG. 1A is a perspective depiction of a tire casing having been roughly shaped.

FIG. 2 is a schematic depiction from a side view thereof of the buffing step of the shaping station according to the present invention.

FIG. 2A is a perspective view of the FIG. 1A prepared tire casing having been buffed and in suitable form for use in the recapping process.

FIG. 2B is an alternate view of the buffing step of the shaping station, depicted as a sectional view showing the buffing wheel used in the buffing step of the shaping station.

FIG. 10 shows the safety band cinched about the closed mold, ready for the tire compound to be injected therein.

FIG. 11 shows the tire compound being injected therein.

FIG. 14 shows a tire finished according to the present invention.

FIG. 15 is a sectional view taken along lines 15—15 of FIG. 14.

FIG. 16 shows one preferred system by which the tire of FIG. 14 will have been fabricated.

DESCRIPTION OF PREFERRED EMBODIMENTS

Figure 17:
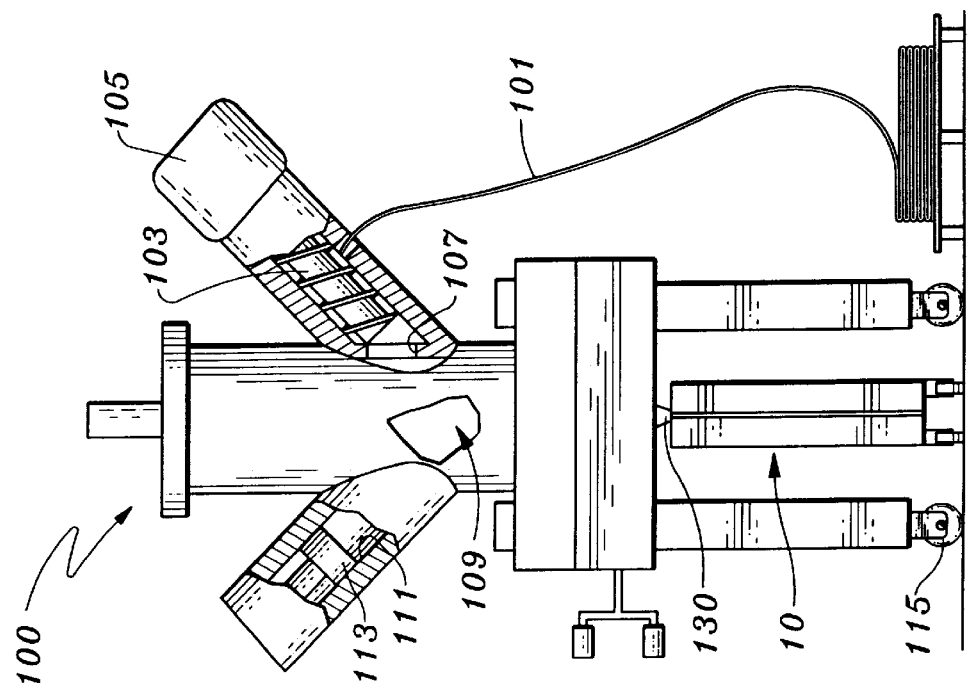
FIG. 17 is a view of the injector shown in FIG. 16.

Considering the drawings, wherein like reference numerals denote like parts throughout, reference numeral 10 is directed to a matrix according to the present invention; reference numeral 100 is directed to an injector according to the present invention; and reference numeral 1000 is directed to the system (FIG. 16) according to the present invention.

In its essence, and as shown in FIG. 16, a plurality of matrices 10 all communicate with an air inlet 2 and a water inlet 4 as well as an air outlet 6 and a water outlet 8 emanating from a communal trunk 200 and removably attached thereto by detachable couplings C. Further, each matrix can couple to an AC outlet W/S via an AC cord 301 which communicates with a resistive heating element 302 contained in the matrix. When decoupled from the trunk, the matrices 10 move in the direction of the double ended arrows B and communicate with the injector 100. The injector 100 preferably moves in a direction perpendicular to the direction of the arrow B, along arrow D. The injector receives a supply of air along arrow A and a supply of uncured tire compound U as indicated diagramatically in FIG. 16 by arrow U. Thus, as the injector 100 moves along the direction of the double ended arrow D, it receives one matrix which has been removed from the trunk 200. First a finished cured tire is removed from the matrix and next an abraded tire casing is mounted in that matrix for building a tread pattern thereabout as to be described. Once the rubber or compound has been placed on the prepared tire casing, the matrix 10 is recoupled to the trunk system for treatment with hot water and air therewithin to allow the tire to cure. In this way, a single injector 100 can service a multiplicity of matrices 10 to maximize the number of tires made from one injector 100.

More particularly, and with respect to FIGS. 1, 1A, 2, 2A and 2B the tire casing of an old tire T is shown as being prepared for the retread process. As shown in FIGS. 1 and 1A, a tire T is mounted on a wheel W adapted to be driven by a shaft S. The tire T is contacted with a coarse grinder G so that any out-of-round condition for the tire can be rectified. In this manner, the FIG. 1A tire will have portions removed defining eccentricities or out-of-round conditions.

Subsequently, the roughly shaped tire T is shown in FIG. 2 as being mounted on another wheel W driven by a shaft S in operative engagement with a buffer R which provides a buffed surface on the tire as shown in FIG. 2A. The buffed surface actually has a fiber-like "hill and valley" texture which provides an enhanced gripping area when the tire compound is applied thereto. As further shown in FIG. 2B, a carbide wheel may be also used as a buffer R' to render the side surfaces of the wheel W prepared for the retreading process. In view of FIG. 2B, it is demonstrated that the surface to be prepared can be from bead to bead, wing to wing, shoulder to shoulder, or any point in between depending on the desired area to be covered by the recap band, according to the present invention. With the surface to be prepared identified, the carbide wheel R is then moved across the surface of the wheel W, buffing it and preparing it for the retreading process.

Figure 3:
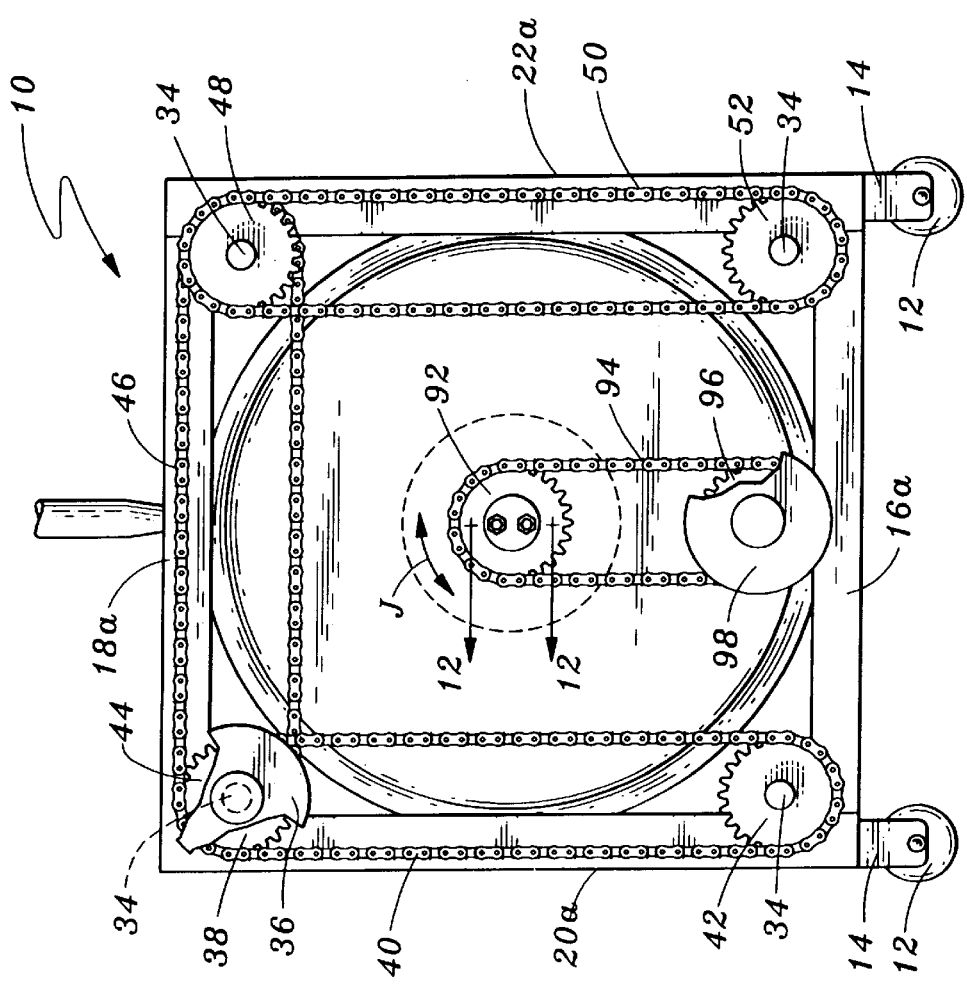
FIG. 3 is a side view of a recapping matrix according to the present invention.
Figure 7:
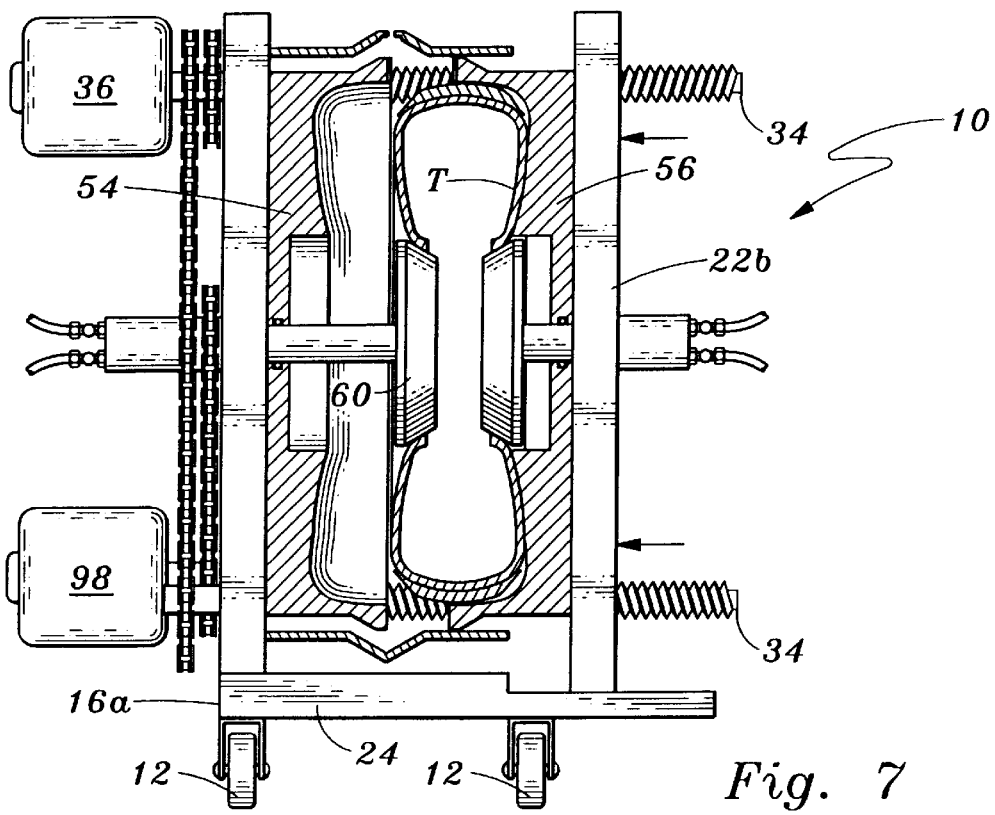
FIG. 7 shows the tire after having received the band of uncured tire compound and being further closed.
Figure 8:
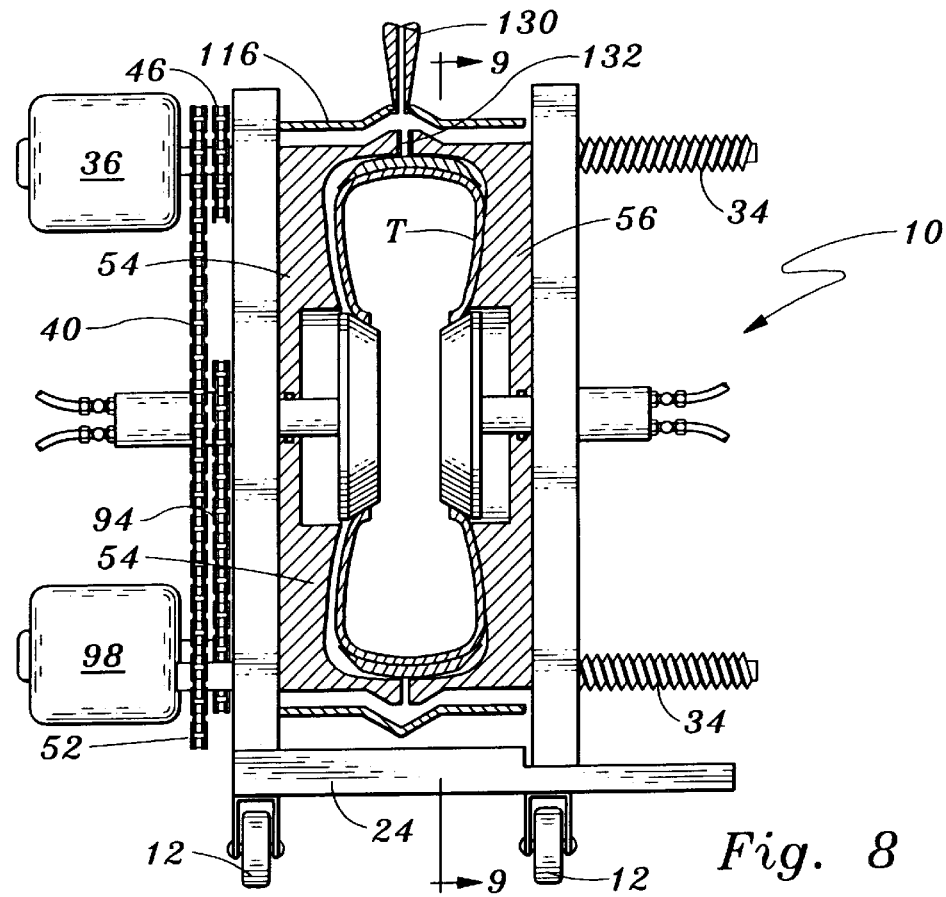
FIG. 8 shows the matrix in a closed position substantially ready to receive the tire compound once a safety band has been latched thereabout.
Figure 9:
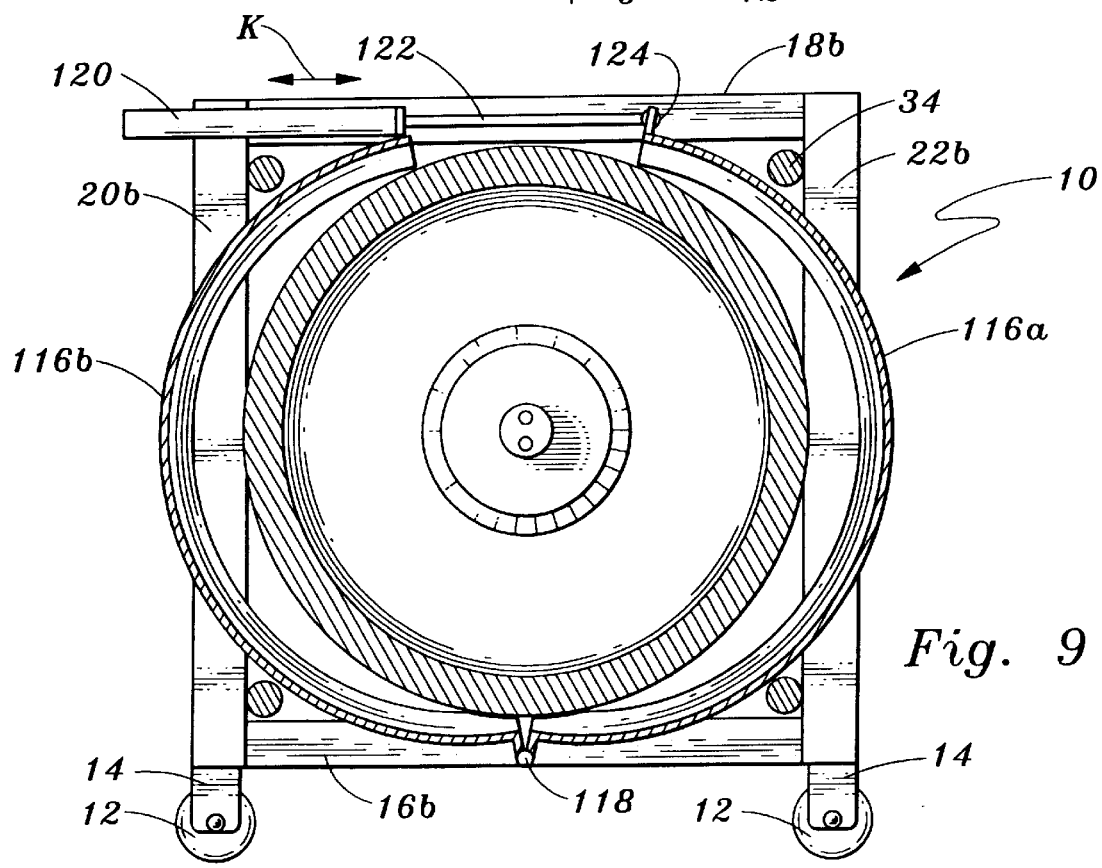
FIG. 9 is a side view of FIG. 8 showing the safety band in an undeployed position ready for cinching.

FIG. 3 is a side view of the matrix shown in FIGS. 4 through 13. In essence, the matrix 10 is supported above the ground by four castor-type wheels 12. One pair of wheels is shown in FIG. 3 and a second parallel set extends on an opposite side as shown in FIG. 9. The castors support four legs 14 extending upwardly therefrom. The legs 14 of FIG. 3 are interconnected by a transverse brace 16a having a spaced parallel horizontal counterpart 18a located at a topmost portion of the matrix. Braces 16a and 18a are interconnected by vertical braces 20a and 22a at distal extremities of each of the braces 16a, 18a, collectively defining a first rectangular frame. The vertical braces 20a and 22a are coaxial with the legs 14 of FIG. 3.

Figure 4:
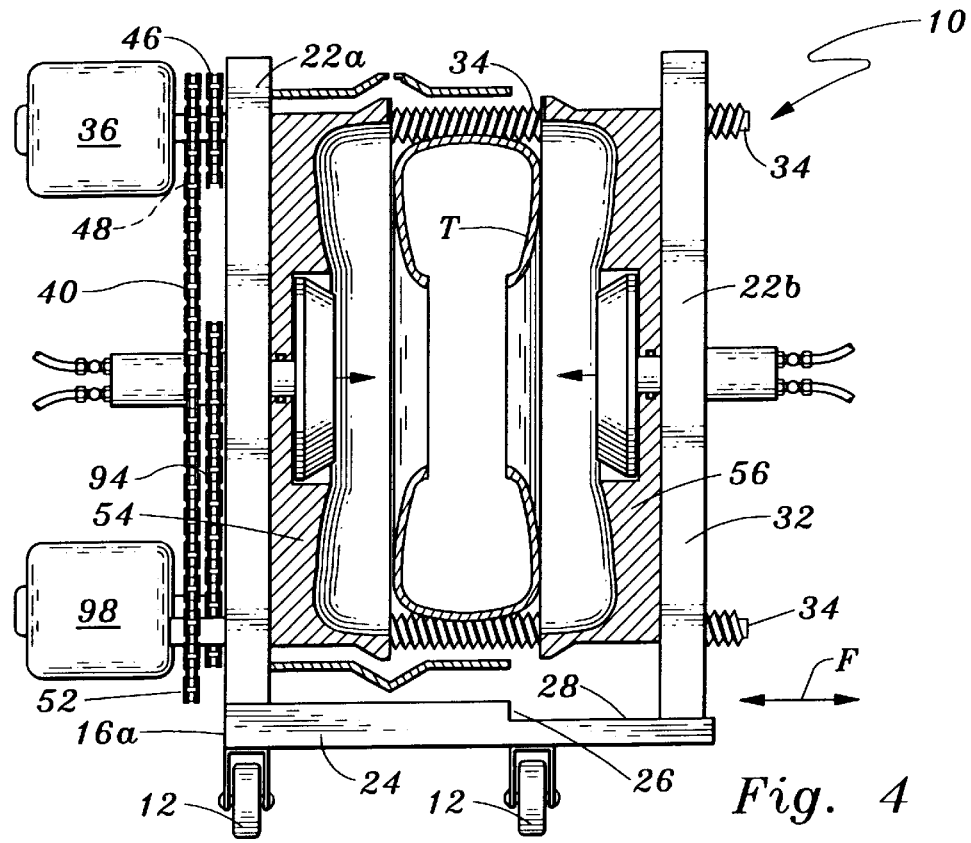
FIG. 4 is a partial sectional view taken along a vertical, longitudinal section line of FIG. 3 showing the matrix in an open position with a tire casing inserted therein.

FIG. 4 shows that the intersection of vertical brace 22a and horizontal lower brace 16a conjoin with another lower brace 24 that extends between the two wheels 12 of FIG. 4 which share a common axis of rotation. The wheel exposed in FIG. 4, but occluded in FIG. 3 is inboard from the right hand extremity of the matrix 10. Brace 24 has a necked-down portion 26 that begins directly above the last named wheel. The necked-down portion 26 includes a top surface 28 which supports a vertical brace 22b on a side of the matrix opposite from, but parallel to the vertical brace 22a. Similarly, braces 16a, 18a and 20a have counterparts 16b, 18b and 20b shown in FIG. 9 which define a second rectangular frame. Comparing FIGS. 4 and 13, for example, it is seen that the vertical brace 22b moves along arrow F from an extreme position outboard the brace 24 to an inboard position immediately adjacent the area where the brace 24 is necked-down at 26. This defines a position where the matrix is closed. Thus, the matrix is defined as first and second substantially rectangular frame members spaced apart by an area adapted to open and close, within which a mold cavity is disposed for receiving a recap tire. The mold cavity will be described later.

At the intersection of the horizontal and vertical braces, the rectangular frames have screw threads extending therebetween. By having four screw threads 34 at the extremities, the matrix can move from the open and closed positions along arrow F to be described. The screw threads 34 are advanced and retracted by means of a plurality of gear trains connected to a common motor 36. The motor 36 (FIG. 3) includes a first sprocket 38 which communicates with a chain 40 that passes over a lower left hand sprocket 42. Another sprocket 44, also driven directly by the motor 36, extends to an upper right hand corner of the frame via chain 46. It loops over a double sprocket 48 which in turn drives a lower right hand corner sprocket 52 by means of chain 50. In this way, all four threaded shafts 34 move in synchrony.

Figure 5:
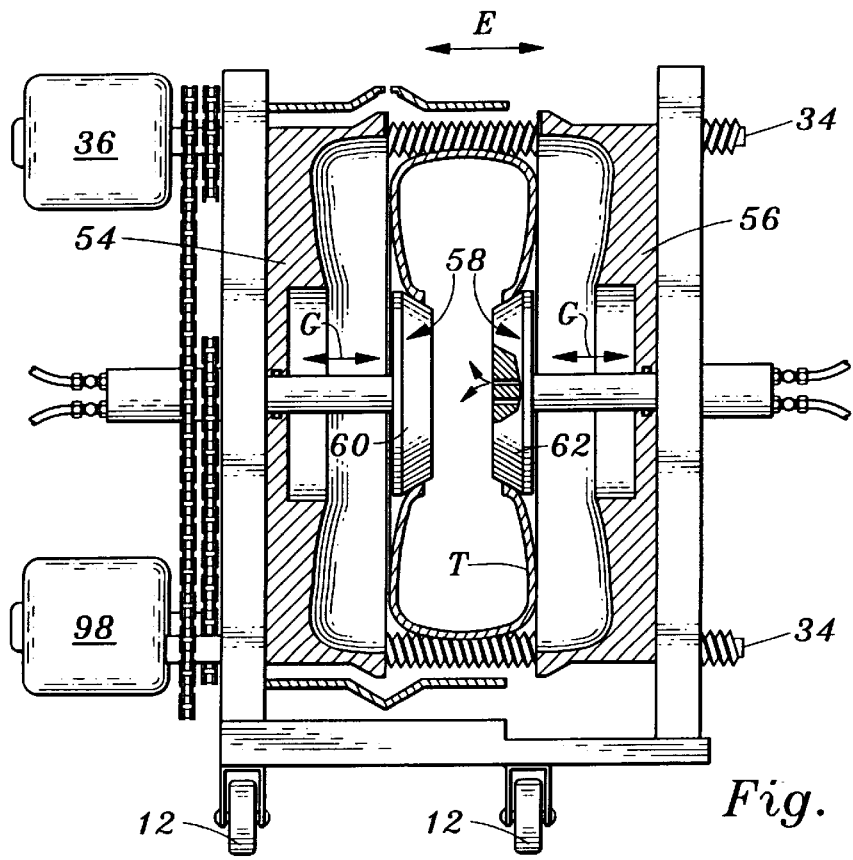
FIG. 5 is similar to FIG. 4 showing the mold matrix in a stage of closing in on a tire casing to be recapped.
Figure 13:
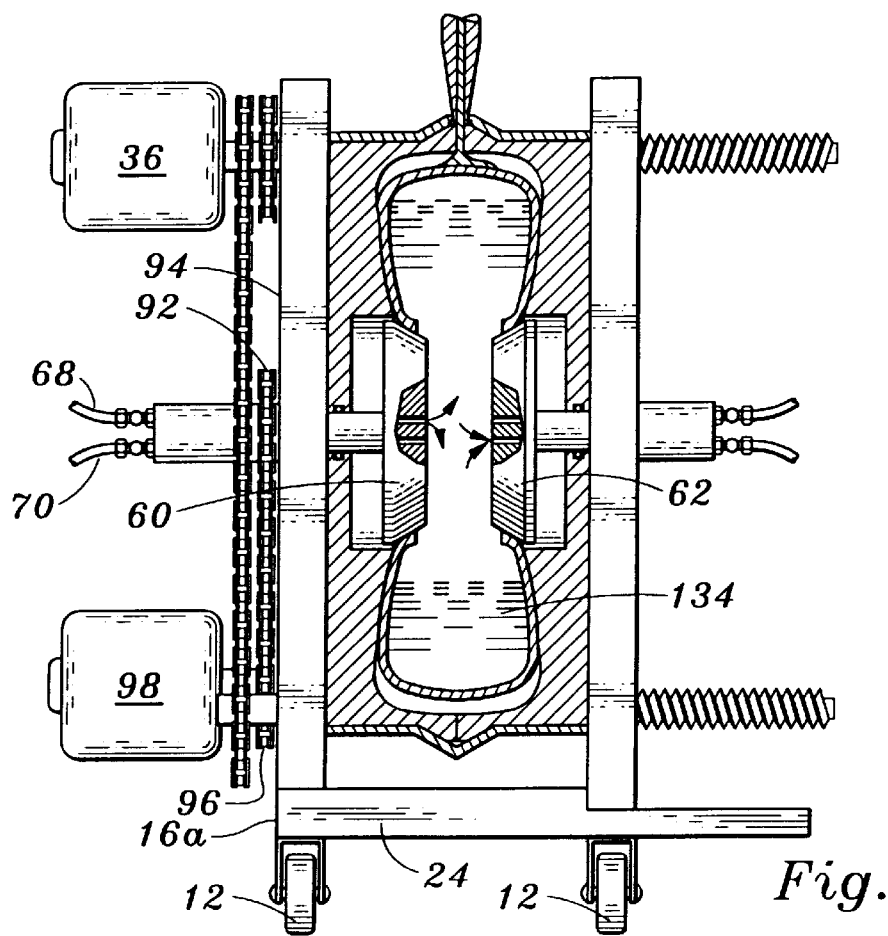
FIG. 13 shows the tire being partially deformed during the injection process and being resisted by fluidic pressure.

As mentioned, each half of the frame of the matrix 10 supports one half of a mold cavity. As shown in FIG. 5, one mold cavity half 54 is located on the first frame half immediately adjacent the motor 36 while another mold cavity half 56 is located adjacent free ends of the threaded shafts 34 on the second frame half. The mold halves move along the direction of the double ended arrows E to go from an open position as shown in FIG. 4 to a closed position as shown in FIG. 13. The mold cavity halves 54, 56 when closed have the general inner contour of the outer periphery of a finished tire as shown in FIGS. 14 and 15.

Figure 12:
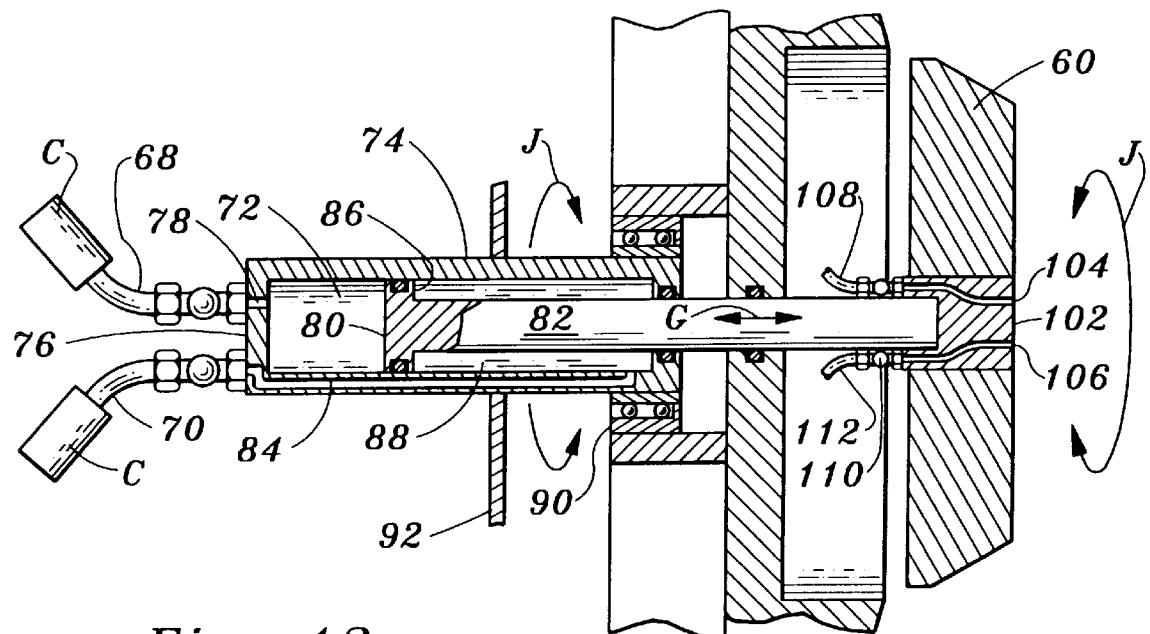
FIG. 12 shows a sectional view along lines 12—12 of FIG. 3.

A central core of the mold cavities 54 and 56 include a space for accommodating a rim 58 for supporting the tire T. In a preferred form of the invention, the rim is formed from two parts. FIG. 12 shows detail of one of the rim halves 60 and its operating geometry. The second rim half 62 parallels the following discussion of FIG. 12. Each half of the rim 60, 62 is adapted to reciprocate along the direction of the double ended arrows G. The reciprocation is caused by means of a pneumatic air drive where the matrix 10 receives air from an input A on injector 100 of FIG. 16 and leads to conduits 64 and 66 of FIG. 16 adapted to couple with conduits 68 and 70 of FIG. 12. A quick coupler C, FIG. 16, facilitates the coupling and uncoupling with a complementally formed coupler C of FIG. 12. Air forced into inlet 68 communicates with a hollow 72 disposed within a substantially cylindrically shaped housing 74 that is mounted on a side of the matrix 10. The cylindrical housing 74 has an end wall 76 which receives the air conduits 68 and 70. The conduit 68 communicates through the end wall 76 via passageway 78 allowing access to the interior 72. Air enters along the direction of the arrow I and causes the chamber to fill with fluidic pressure. A piston 80 having a connecting rod 82 moves from left to right as shown in FIG. 12. The piston 80 causes the rim 60 to engage an annular bead that is located on a tire casing of the tire as suggested in FIG. 5, with contact just having been made. In one form of the invention, the rim is configured as a frusto-conical solid with a smaller diameter frustum nearest a center of the tire casing.

When the rim 60 is to be disengaged from the annular bead of the tire casing, a negative pressure can be applied via conduit 68 providing a "pull" effect or further pressure can be positively provided via conduit 70 communicating with interior passageway 84 which pushes against a back face 86 of the piston by providing air in a chamber 88 on a side of the cylindrical sleeve remote from the interior 72 to move the piston in an opposite direction (i.e. from right to left of FIG. 12). This corresponds with the release of the tire casing from the rims 60, 62. Besides a "pull" system or "push" system, a hybrid "push-pull" system, could be used for rapid motion of rims 60, 62 for opening and closing (using both conduits 68, 70).

The cylindrical housing 74 is mounted within the matrix 10 by means of a bearing 90. This allows for the housing 74 to rotate along the arrow J and therefore cause the rim 60 to also rotate about the arrow J. Since the annular bead on the tire is secured to the rims 60 and 62, the tire also rotates about the arrow J. Rotation is imparted to the cylindrical housing 74 by means of a sprocket 92 which is driven as shown in FIG. 3. More specifically, the sprocket 92 cooperates with a chain 94 to be driven by a complemental sprocket 96 and in turn driven by motor 98.

Each rim, 60 and 62, includes a center core 102 (FIG. 12) provided with a first conduit 104 and a second conduit 106. These conduits communicate from an exterior of the rims 60, 62 with conduit leads 108 and 112. These conduits 108 and 112 are isolated from the core 102 and its rotation about the arrow J and explained infra by means of a further bearing assembly 110.

With the foregoing structure in mind, the sequence of operations reflected in FIGS. 4 through 13 can now be appreciated. As mentioned above, after a completed cured recapped tire has been removed from the matrix 10, an uncured tire casing is placed within the center of the matrix 10 as suggested in FIG. 4. The mold cavities 54 and 56 are then closed along the direction of the double ended arrow E as suggested in FIG. 5.

Figure 6:
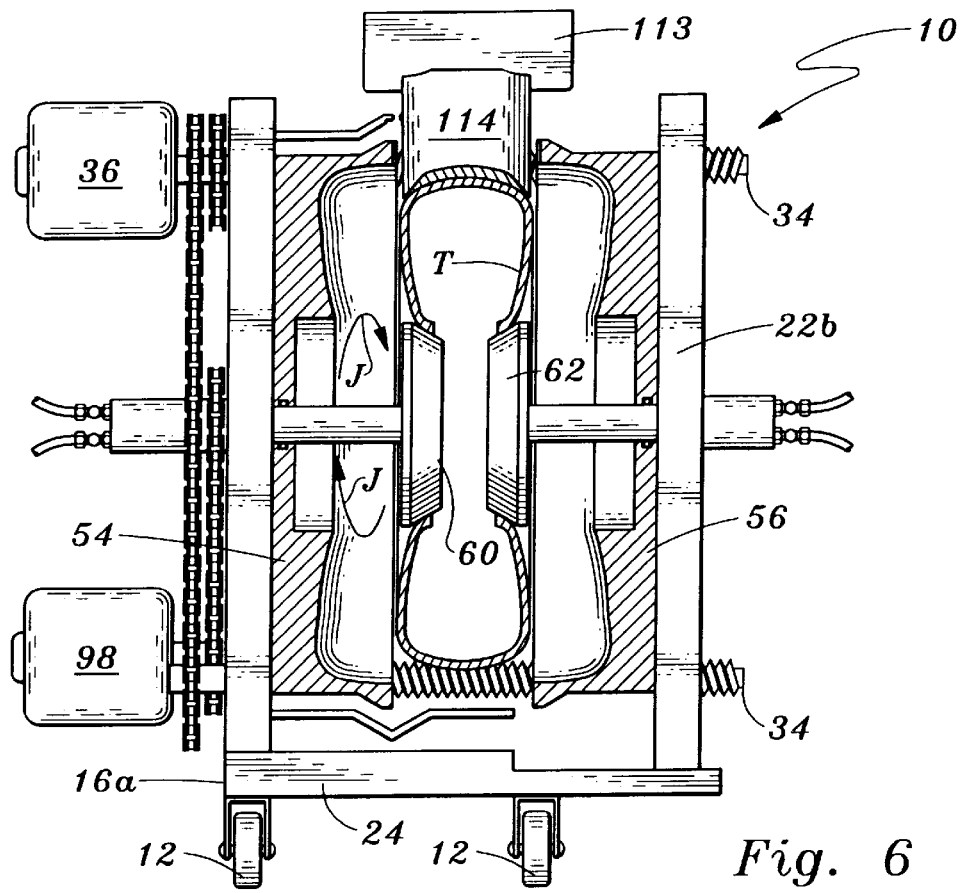
FIG. 6 is a view similar to FIGS. 4 and 5 showing the mold matrix partially open and receiving a band of uncured tire compound to circumscribe a periphery of the tire casing.

When the mold is almost closed, in some instances it is desirable to provide an intermediate band of uncured tire compound as a build-up onto the tire casing prior to the injection of more tire compound. When this is desired, the step in FIG. 6 is utilized. A machine 113 which extrudes uncured tire compound for the recap band in the form of an elongate ribbon 114 is oriented such that the width of the ribbon of uncured tire compound is allowed to circumscribe the outer periphery of the tire casing as shown in FIG. 6. The width of the ribbon of uncured tire compound may be from bead to bead, wing to wing, shoulder to shoulder, or any point therebetween depending on the desired width of the recap band which circumscribes the tire casing. Rotation of the rims 60, 62 along the direction of the arrow J allows the ribbon 114 of uncured tire compound to be wrapped around the tire casing of the tire. This step is not needed in all tires, but preferably can be used when more than twenty pounds of uncured tire compound is to be added around the outer periphery of any tire.

In any event, FIG. 7 reflects detail where the mold is being further closed such that the FIG. 8 configuration of a closed mold will be effected with the exception of the locking clamp 116 shown in FIGS. 8 and 9.

The locking clamp 116 has a hinge 118 at its lowermost extremity and divides the locking clamp into a first portion 116a and a second portion 116b. An opposite side of the clamp remote from the hinge 118 includes a hydraulic actuator 120 having an extensible arm 122 such that the hydraulic actuator 120 is fixed on the rectangular frame housing and locates with a half of the clamp 116b while the hydraulic rod 122 couples to the other half of the clamp 116a whereby rotation and locking of the clamp is possible by linear reciprocation of the hydraulic rod 122 within the sleeve 120 along the direction of the double ended arrows K. A tab 124 connecting to a free end of the hydraulic rod 122 and clamp half 116b assists the safety clamp 116 in circumscribing the first and second halves of the molds 54 and 56 for safety during the high temperature, high pressure operation. As shown in FIG. 8, the closed molds 54, 56 are oriented such that an injector 130 is in line with an injection orifice 132 to allow the liquid tire compound to be added into the mold cavity interior.

With respect to FIG. 11, the injector 130 from the injection station 100 is in communication with the inlet 132 and exposed to an interior of the mold cavities 54 and 56. Notice also in FIG. 10 that an interior of the tire casing is to be filled with an incompressible fluid 134, preferably extremely hot water and preferably less than 100° C. The water enters into the interior of the tire casing via the conduit openings 104. Subsequently, the hot water is allowed to exit via a complemental outlet 106 on the half of the rim 62. As the liquid or viscous tire compound is injected along an outer periphery of the tire, (preferably at less than 340° F. or a temperature which prevents flash curing of the tire compound used) the tire is rotated about the arrow J (FIG. 10) so that a uniform coating of the tire compound extends between the exterior surface of the tire casing and the interior surface of the mold cavities 54 and 56. The interior of the cavity also includes a pattern which when completed parallels the tread pattern shown in FIGS. 14 and 15 so that subsequent surface finishing of the tire is not required. The effect of the hot water 134 is two fold. The first purpose is to resist the deformation of the tire which would normally occur as hydrostatic pressure increases because of injecting the tire compound into the mold cavity. Thus, with incompressible fluid in the interior cavity, higher operating pressures both inside and outside the tire casing are now possible. These higher operating pressures yield a much better quality of retread by providing a recap band with the superior properties heretofore found only with precured tread. A second advantage is that with high water temperature (and with increasing hydrostatic pressure) the curing time of the uncured tire compound is accelerated.

FIG. 13 is a view similar to FIG. 10 with the exception that the intervening layer of a strip of uncured material discussed infra with respect to FIG. 6 has been avoided.

By way of definition, it is important to note that by "uncured tire compound" it is traditionally meant unvulcanized rubber in its conventional sense. However, rubber formulations and rubber chemistry in the art of tire making is extremely complex in modern times and most tire compounds are not one hundred percent pure rubber. Yet, presently there is still a clear line of demarcation between cured and uncured tire compounds. A tire compound that has already been subjected to considerable heat and pressure is cured, and therefore is "preset." Most cold capping processes typically use precured recap bands which are cured flat, and therefore retain a memory of their flat shape. Most recaps today use cold capping and require the use of cured tire compounds. Because the cold capping process puts a cured recap band (with a memory of a flat shape) on top of a rounded tire casing, the recap band does not readily adopt to its new shape. This is the problem with prior art recaps. The present invention has as one hallmark the utilization of uncured tire compound. Upon subsequent application of heat and pressure, the uncured tire compound cures as it adheres to the shape of the tire casing, thus optimizing the vulcanization of the uncured tire compound and beneficially affecting the bond with the tire casing. This memory forming on the tire characterizes one hallmark of the instant invention.

FIG. 11 reflects a stage where the rubber is filled within the cavity of the mold halves so that the matrix 10 can be removed from the injection mold machine 100 and thereafter allowed to cure as shown in FIG. 16 where the matrix is reconnected to hot air or hot water to facilitate the cure process. FIG. 11 further suggests that the remaining liquid has been removed from the matrix 10 and is communicated with the trunk line prior to the injector 130 being withdrawn.

FIG. 17 shows the injector 100. The injector is coupled to the matrix 10. Strip stock 101 is fed to an extruder 103 configured as an auger powered by a motor 105. A head gate 107 allows the uncured tire compound strip stock 101 to pass therebeyond, into an injection cavity 109. An injection cylinder 111 receives a double acting piston 113 therewithin which drives the strip stock 101 through the injector nozzle 130. The injector 100 is supported on wheels 115 to allow translation along arrow "D" of FIG. 16.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method of recapping a tire, comprising the steps of:
   placing the tire in a full circumferential matrix;
   seating the tire on a tire rim with air pressure;

closing said matrix;

rotating said tire;

forcing tire compound into said matrix and onto a periphery of said tire as said tire is rotated;

replacing the air within said tire by forcing an incompressible fluid into an interior of said tire;

maintaining a pressure differential between the tire compound and the interior of said tire until the tire compound is cured;

evacuating the fluid from said tire;

opening said matrix; and removing said tire.

2. The method of claim 1 including providing said incompressible fluid as heated water.

3. The method of claim 2 including maintaining the temperature of the heated water below 100° C.

4. The method of claim 1 including injecting air initially at less than 40 psi into said tire to seat the tire on the rim.

5. The method of claim 1 including forcing the tire compound in an uncured state at a pressure less than 600 pounds per square inch.

6. The method of claim 1 including maintaining the temperature of tire compound during forcing the tire compound into said matrix at less than 340° F.

7. The method of claim 1 including increasing said fluid pressure inside said tire to stabilize said tire and keep it from collapsing while the tire compound is being injected.

8. The method of claim 1 including increasing fluidic pressure inside said tire when filled with said fluid to 560 psi, wherein said fluid is heated water, while increasing delivery pressure on said tire compound to 600 psi, whereby said tire compound is rapidly cured.

9. The method of claim 1 including prebuilding said tire with a strip of tire compound by attaching the strip to said tire before said tire is placed into said matrix and injecting the tire compound needed to retread said tire into said matrix before curing.

10. The method of claim 1 including grinding and buffing the tire before recapping.

11. The method of claim 10 wherein said incompressible fluid to be injected into said tire interior is heated water.

12. The method of claim 11 further comprising the step of pressurizing said water within said tire interior.

13. The method of claim 1 further comprising the step of forming a tread pattern on said tire compound.

14. The method of claim 1 further comprising the step of wrapping an uncured tire compound ribbon about an outer surface of said tire prior to the tire compound forcing step.

15. The method of claim 14 wherein the wrapping step further includes:

holding the matrix open;

dispensing a tire compound ribbon above said tire outer surface;

rotating the tire to facilitate said wrapping; and closing said matrix.

* * * * *